United States Patent [19]

Roder et al.

[11] Patent Number: 5,564,995
[45] Date of Patent: Oct. 15, 1996

[54] PLANETARY TRANSMISSION WITH A SNAP SECURITY DEVICE AGAINST AXIAL DISPLACEMENT OF BEARING RINGS

[75] Inventors: Ulrich Roder, Nürnberg; Sigurd Wilhelm, Weisendorf; Werner Hehn, Erlangen; Uwe Hammerl, Herzogenaurach; Doris Greiner, Hagenau; Wolfgang Hentschke, Herzogenaurach; Udo Reinhardt, Hochstadt, all of Germany

[73] Assignee: Ina Walzlager Schaeffler KG, Germany

[21] Appl. No.: 407,419

[22] Filed: Mar. 17, 1995

[30] Foreign Application Priority Data

Apr. 2, 1994 [DE] Germany ............................ 44 11 605.5

[51] Int. Cl.⁶ ................................................. F16H 57/08
[52] U.S. Cl. ............................ 475/331; 475/346; 475/902; 384/539
[58] Field of Search ..................................... 475/331, 902, 475/346; 384/536, 539

[56] References Cited

U.S. PATENT DOCUMENTS

| | | | |
|---|---|---|---|
| 3,481,655 | 12/1969 | Campbell | 384/536 |
| 3,797,900 | 3/1974 | Secola | 384/539 |
| 3,897,988 | 8/1975 | Dickinson et al. | 384/539 |
| 4,799,396 | 1/1989 | Ho | 475/331 |
| 4,854,437 | 8/1989 | Harrington et al. | 384/536 |
| 5,470,165 | 11/1995 | Bissinger | 384/536 |

FOREIGN PATENT DOCUMENTS 2276214 9/1994 United Kingdom .................. 384/539

*Primary Examiner*—Charles A. Marmor
*Assistant Examiner*—Sherry Lynn Estremsky
*Attorney, Agent, or Firm*—Bierman & Muserlian

[57] ABSTRACT

A planetary transmission comprising a planet carrier (6) connected rotationally fast to a driving shaft (3), a planet gear (7) of which planet carrier (6) is simultaneously in mesh with an annulus (9) fixed on a housing (1,2) and with a sun gear (10) connected rotationally fast to a driven shaft (12) arranged concentric with the driving shaft (3), each of the driving shaft (3) and the driven shaft (12) being mounted for rotation relative to the housing (1,2) on at least one bearing (16,17) and outer and inner rings (22,25 31 34) of said bearings (16,17) being seated on bearing seats (5,14,11,15), characterized in that at least one of two bearing seats (5,14,11,15) of each bearing (16,17) comprises at an axial end thereof, a resilient projection (19,24,27,32) engaging by elastic reverse deformation, an end face of the inner or outer bearing ring (22,25,31,34) seated thereon.

8 Claims, 2 Drawing Sheets

PLANETARY TRANSMISSION WITH A SNAP SECURITY DEVICE AGAINST AXIAL DISPLACEMENT OF BEARING RINGS

A planetary transmission comprising a planet carrier connected rotationally fast to a driving shaft, a planet gear of which planet carrier is simultaneously in mesh with an annulus fixed on a housing and with a sun gear connected rotationally fast to a driven shaft arranged concentric with the driving shaft, each of the driving shaft and the driven shaft being mounted for rotation relative to the housing on at least one bearing, preferably a rolling bearing, and outer and inner rings of said bearings being seated on bearing seats is known for example from "Zahnradgetriebe" by Johannes Lohmann, Springer Verlag, 1970. In the single-step planetary transmission shown in FIG. 3.57 on Page 78, the bearing rings of the rolling bearings are supported either on fixed radial flanges of the housing and the shafts or on locking rings snapped into grooves, and thus secured against axial displacement The use of locking rings is appropriate when the bearing ring is pushed from one side axially on to its bearing seat and has then to be secured against axial displacement on this side. However, the use of locking rings increases the number of the already numerous individual components of such a planetary transmission and increases the cost thereof.

OBJECTS OF THE INVENTION

It is an object of the invention to provide a planetary transmission with a reduced number of individual components, particularly those for the axial securing.

This and other objects and advantages of the invention will become obvious from the following detailed description.

SUMMARY OF THE INVENTION

The novel planetary transmission of the invention comprising a planet carrier (6) connected rotationally fast to a driving shaft (3), a planet gear (7) of which planet carrier (6) is simultaneously in mesh with an annulus (9) fixed on a housing (1,2) and with a sun gear (10) connected rotationally fast to a driven shaft (12) arranged concentric with the driving shaft (3), each of the driving shaft (3) and the driven shaft (12) being mounted for rotation relative to the housing (1,2) on at least one bearing (16,17) and outer and inner rings (22,26,31,34) of said bearings (16,17) being seated on bearing seats (5,14, 11,15), is characterized in that at least one of two bearing seats (5,14,11,15) of each bearing (16,17) comprises at an axial end thereof, a resilient projection (19,24,27,32) engaging by elastic reverse deformation, an end face of the inner or outer bearing ring (22,26,31,34) seated thereon.

The object is achieved by the fact that at least one of the two bearing seats of the two bearings comprises at an axial end thereof, a resilient projection engaging an end face of the bearing ring seated thereon. In this way, it is guaranteed that the inner or the outer bearing ring, as the case may be, can be pushed on to its bearing seat from one side because the resilient spring yields at first radially to the ring concerned and then engages an end face thereof by resilient relaxation when said ring has reached its intended position on the bearing seat. Therefore, after insertion of the bearing ring onto its bearing seat, no additional component involving further mounting steps is required for the axial securing of said ring. It is understood that the driving and driven ends of the planetary transmission of the invention can be interchanged so that the driven shaft becomes the driving shaft, and vice versa.

The resilient projection is made preferably in the form of an axially projecting extension starting from the bearing seat and merging into a radial lug. In the radial directions, this axial extension is configured for example as a resilient crossbar.

Further features of the planetary transmission of the invention make it particularly suitable for uses in which pre-assembled groups of components are desired. According to one embodiment of the invention, a hub of the planet carrier forms the bearing seat for the inner ring of one of the bearings, and a resilient ring comprising axial slots and forming the axial extension is arranged adjacent to the hub, an axially extending annular groove being arranged radially inwards from and directly adjacent to the resilient ring. This embodiment permits the complete pre-assembly, for example of a deep groove ball bearing on the hub of the planet carrier. Thus, a pre-assembled unit is obtained consisting of the deep groove ball bearing, the planet carrier and the hub. The annular groove is provided so that the resilient ring can yield radially inwards.

According to another embodiment of the invention, a hub of the sun gear forms the bearing seat for the inner ring of the other bearing, and a resilient ring comprising axial slots and forming the axial extension is arranged adjacent to the hub, an axially extending annular groove being arranged radially inwards from and directly adjacent to the resilient ring. This embodiment offers the same advantages as the aforementioned embodiment and results in the formation of a pre-assembled unit consisting of the hub, the annulus and, for example, a deep groove ball bearing.

If the driven shaft is made as a hollow shaft through which the driving shaft is inserted, a pre-assembled unit can be obtained for the completion of whose assembly, only the housing remains to be mounted.

The rotationally fast connection between the hub of the sun gear and the driven shaft is obtained by a toothing, made for example by knurling, provided between the driven shaft and the hub in the region of the bearing seat. This embodiment of the invention is advantageous because, due to high torque transmission into the hub of the sun gear, the toothing permits an excellent positive engagement whereby radially outward directed forces can be advantageously transferred into the inner bearing ring which therefore serves at the same time to stiffen the hub of the sun gear in the region of the inner toothing.

The hub of the sun gear can be further advantageously modified so that a lug is formed on the inner periphery of the hub and engages into a peripheral groove of the driven shaft. This embodiment of the invention guarantees that the driven shaft is secured against axial displacement relative to the hub. If, as mentioned above, the driving shaft is inserted through the hollow driven shaft, it is advantageous to provide a sliding bearing between the driving and the driven shaft in the region of the bearing seat.

Figure 1:
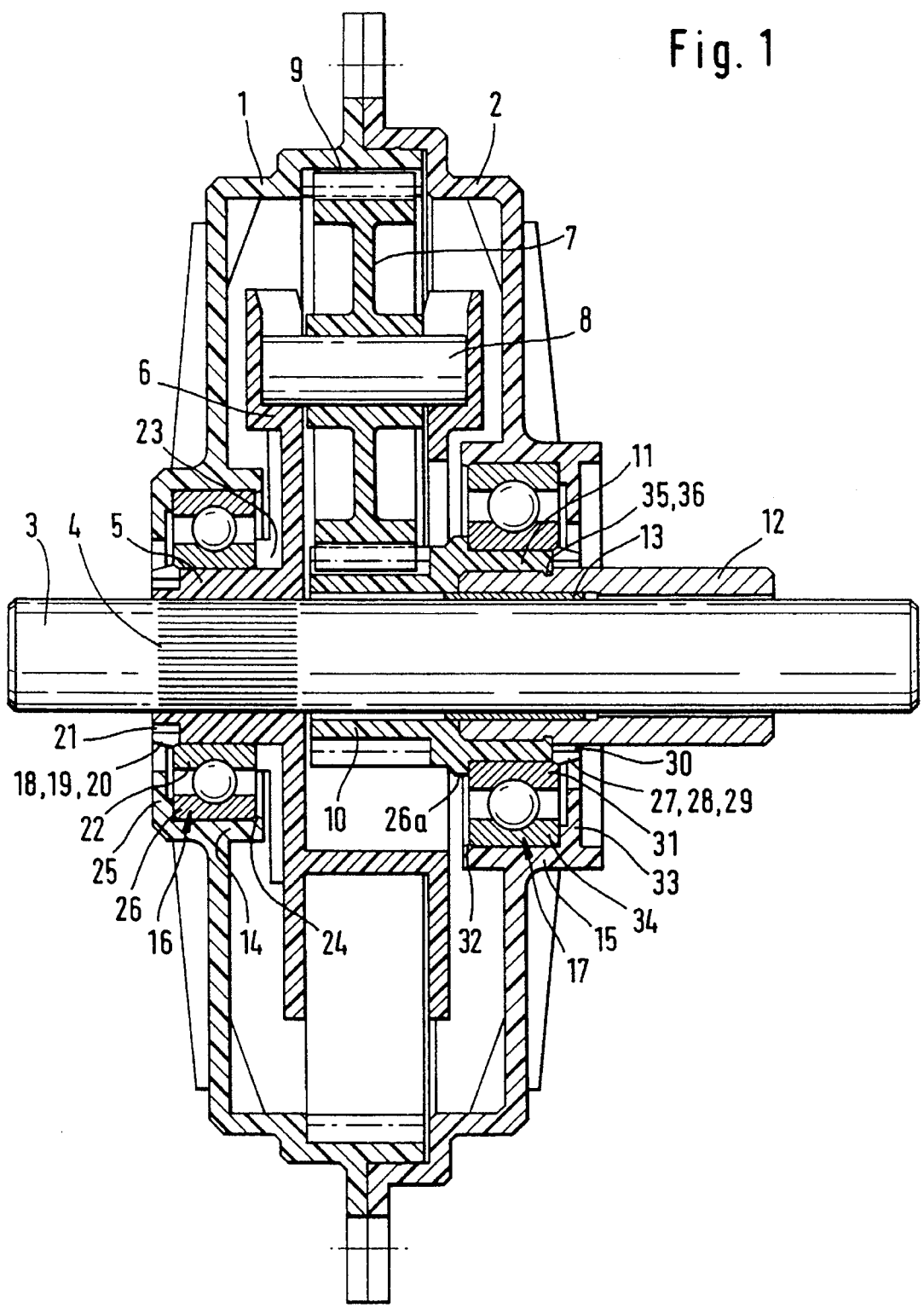
FIG. 1 is a longitudinal cross-section through a planetary transmission of the invention.

The planetary transmission shown in FIG. 1 comprises two vertically separated housing halves (1,2) which are firmly connected to each other by a snap connection, not shown. A driving shaft (3) is inserted through both housing halves (1,2) and comprises a toothing (4) by which it is connected rotationally fast to a hub (5) of a planet carrier (6). A planet gear (7) is mounted rotatable relative to the planet carrier (6) on a pin (8). The single-step planet gear (7) meshes with an annulus (9) formed on the inner periphery of the housing half (1) and with a sun gear (10) mounted rotatable relative to the driving shaft (3).

A hub (11) of the sun gear (10) is connected rotationally fast to a driven shaft (12). The driving shaft (3) is inserted through the driven shaft (12) which is made as a hollow shaft, a sliding bearing (13) being provided between the driven shaft (12) and the driving shaft (3). Between circular cylindrical portions (14,15) of the housing halves (1,2) and the hubs (5,11) of the planet carrier (6) and the sun gear (10) respectively, there are arranged deep groove ball bearings (16,17). On its outer axial end, the hub (5) comprises an integrally formed annular axial extension (18) on whose outer peripheral surface is formed a cone (19) which tapers axially in an outward direction. The annular axial extension (18) comprises several axial slots (20) spaced on its periphery and these axial slots (20) extend through the entire radial thickness of the axial extension (18). Radially inwards of the axial extension (18), there is formed a circumferental annular groove (21) whose axial dimension corresponds to that of the axial slots (20). In this way, it is guaranteed that the axial extension (18) can be displaced resiliently in both radial directions.

At its end facing an inner ring (22) of the deep groove ball bearing (16), the outer diameter of the cone (19) is larger than the inner diameter of the inner ring (22). Due to the fact that the cone (19) engages an end face of the inner ring (22), it is guaranteed that the inner ring (22) is secured against falling off the hub (5). At its axial end facing away from the cone (19), the inner ring (22) abuts against a stiffening rib (23) integrally formed on the planet carrier (6), several such stiffening ribs being provided spaced over the periphery. On one of its axial ends, the bearing seat (14) of the housing halve (1) comprises a radially inwards oriented resilient annular bead (24), and, on its other axial end, a radial flange (25). Between these two ends, there is arranged an outer ring (26) of the deep groove ball bearing (16), which outer ring is secured at its two ends against axial displacement by the radial flange (25) and the resilient annular bead (24).

The axial securing of the deep groove ball bearing (17) is effected in a similar manner. On one of its axial ends, the hub (11) of the sun gear (10) comprises a radial flange (26a) and, on its other axial end, an axial extension (27) which, similar to the axial extension (18) described above, comprises axial slots (28) and a cone (29). Radially inwards of the axial extension (27), there is likewise formed an annular groove (30). Similar to the inner ring (22) of the hub (5), the inner ring (31) of the deep groove ball bearing (17), When mounted on the hub (11), locks in so that an end face of the inner ring (31) is engaged by the cone (29). Similar to the mounting arrangement of the hub (5), the circular cylindrical portion (15) of the housing half (2) comprises, on its respective axial ends, a radially inwards oriented resilient annular bead (32) and a radial flange (33) between which an outer ring (34) of the deep groove ball bearing (17) is arranged.

In the present case, the driven shaft (12) is made of steel and the hub (11) of the sun gear (10) is made of a plastic material and injection molded on to the driven shaft (12). To prevent an axial displacement of the driven shaft (12) relative to the hub (11), a radially inwards projecting bead (35) is formed on the inner periphery of the hub (11) and engages into a peripheral groove (36) of the driven shaft (12).

In the present embodiment, the hub (5) of the planet carrier (6), the axial extension (18), the cone (19) into which this extension merges and the planet carrier (6) are made of plastic material in one piece with one another as are also the hub (11) of the sun gear (10), the axial extension (27), the cone (29) into which this extension merges and the sun gear (10). The housing halves (1,2) and the planet gears (7) are likewise made of a plastic material, and the hub (5) of the planet carrier (6) is injection molded on to the driving shaft (3).

Figure 2:
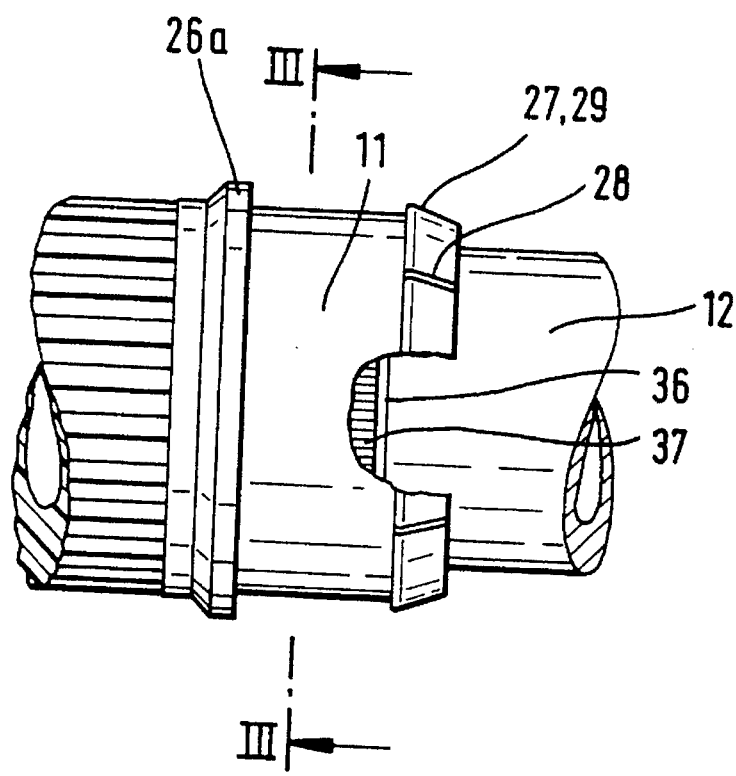
FIG. 2 is a partial cross-section of the hub of the sun gear with a driven shaft insert therein.
Figure 3:
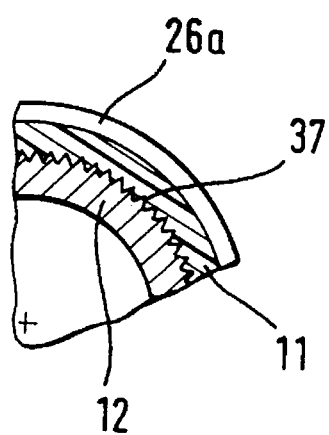
FIG. 3 is a partial cross-section taken along line III—III of FIG. 2.

FIG. 2 shows a partial side view of the driven shaft (12) and the hub (11) connected thereto. In a broken-out region of the hub (11) shown in the figure, there can clearly be seen the peripheral groove (36) and a toothing (37) extending over the entire circumference of the driven shaft (12). The toothing (37) serves to establish a rotationally fast connection between the driven shaft (12) and the hub (11). The figure further clearly shows the axial slots (28) on the axial extension (27). FIG. 3 clearly illustrates the manner in which the hub (11), injection molded on to the driven shaft (12), interlocks with the toothing (37) of the driven shaft (12).

Various modifications of the planetary transmission of the invention may be made without departing from the spirit or scope thereof and it is to be understood that the invention is intended to be limited only as defined in the appended claims.

What we claim is:

1. A planetary transmission comprising a planet carrier (6) connected rotationally fast to a driving shaft (3), a planet gear (7) of which planet carrier (6) is simultaneously in mesh with an annulus (9) fixed on a housing (1,2) and with a sun gear (10) connected rotationally fast to a driven shaft (12) arranged concentric with the driving shaft (3), each of the driving shaft (3) and the driven shaft (12) being mounted for rotation relative to the housing (1,2) on at least one rolling bearing (16,17) and outer and inner rings (22,25,31,34) of said bearings (16,17) being seated on bearing seats (5,14, 11,15), at least one of two bearing seats (5,14,11,15) of each rolling bearing (16,17) comprises at an axial end thereof, a resilient projection (19,24,27,32) engaging by elastic reverse deformation formed by an axially projecting axial extension (18,27) starting from the bearing seat (5,11) and merging into a radial lug (19,29), an end face of the inner or outer bearing ring (22,25,31,34) seated thereon characterized in that a hub (5) of the planet carrier (6) forms the bearing seat for the inner ring (22) of one of the rolling bearings (16), and a resilient ring (18) comprising axial slots (20) and forming the axial extension is arranged adjacent to the hub (5), an axially extending annular groove (21) being arranged radially inwards from and directly adjacent to the resilient ring (18).

2. A planetary transmission of claim 1 wherein the planet carrier (6), its hub (5) and the resilient ring (18) are made of a plastic material by injection molding in one piece with one another.

3. A planetary transmission of claim 1 wherein a hub (11) of the sun gear (10) forms the bearing seat for the inner ring (31) of the other rolling bearing (17), and a resilient ring (27) comprising axial slots (28) and forming the axial extension is arranged adjacent to the hub (11), an axially extending annular groove (30) being arranged radially inwards from and directly adjacent to the resilient ring (27).

4. A planetary transmission of claim 3 wherein the driven shaft (12) is made as a hollow shaft through which the driving shaft (3) is inserted.

5. A planetary transmission of claim 4 wherein, in a region of the bearing seat (11), a sliding bearing (13) is provided between the driving shaft (3) and the driven shaft (12).

6. A planetary transmission of claim 3 wherein a positive engagement is established in a region of the bearing seat (11) between the driven shaft (12) and the hub (11) of the sun gear (10) by a toothing (37) or knurling.

7. A planetary transmission of claim 6 wherein a lug (35) is formed on an inner periphery of the hub (11) of the sun gear (10) and engages into a peripheral groove (36) of the driven shaft (12).

8. A planetary transmission of claim 3 wherein the sun gear (10), its hub (11) and the resilient ring (27) are made of a plastic material by injection molding in one piece with one another.

* * * * *